United States Patent
Astely et al.

(10) Patent No.: US 9,094,199 B2
(45) Date of Patent: *Jul. 28, 2015

(54) METHOD AND ARRANGEMENT IN A TELECOMMUNICATION SYSTEM

(71) Applicant: TELEFONAKTIEBOLAGET L M ERICSSON (PUBL), Stockholm (SE)

(72) Inventors: David Astely, Bromma (SE); Yang Hu, Beijing (CN); Lei Wan, Beijing (CN); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,025

(22) Filed: Aug. 20, 2014

(65) Prior Publication Data

US 2014/0355553 A1 Dec. 4, 2014

Related U.S. Application Data

(63) Continuation of application No. 13/002,144, filed as application No. PCT/SE2008/051427 on Dec. 9, 2008, now Pat. No. 8,867,384.

(60) Provisional application No. 61/076,899, filed on Jun. 30, 2008.

(51) Int. Cl.
*H04L 27/18* (2006.01)
*H04L 1/16* (2006.01)
*H04L 1/18* (2006.01)
(Continued)

(52) U.S. Cl.
CPC ............ *H04L 1/1657* (2013.01); *H04L 1/1635* (2013.01); *H04L 1/1692* (2013.01); *H04L 1/1829* (2013.01); *H04L 5/0055* (2013.01);
(Continued)

(58) Field of Classification Search
CPC ... H04L 1/1635; H04L 1/1692; H04L 1/1829; H04L 27/34
See application file for complete search history.

(56) References Cited

U.S. PATENT DOCUMENTS

| 8,165,035 B2 | 4/2012 | Che et al. |
| 2009/0129317 A1 | 5/2009 | Che et al. |

(Continued)

FOREIGN PATENT DOCUMENTS

| CN | 1451217 | 10/2003 |
| EP | 0570220 A | 11/1993 |

(Continued)

OTHER PUBLICATIONS

Ericsson Details of ACK NAK Building for TDD, 3GPP TSG-RAN WG 1#52b R1-081566, Mar. 2008.
(Continued)

*Primary Examiner* — Ebrahim Golabbakhsh

(57) ABSTRACT

A method in a terminal for providing an ACK/NAK message to a base station is provided. The terminal counts the number of assigned downlink subframes detected from the base station resulting in k. The terminal then establishes whether each of a number of transport blocks comprised in the counted k downlink subframes is correctly received or not. In the case when each one of the transport blocks, comprised in the k downlink subframes is estimated as correctly received the terminal provides to the base station an encoded ACK message for the k subframes, which comprises k, the number of subframes.

1 Claim, 7 Drawing Sheets

(51) Int. Cl.
*H04L 27/34* (2006.01)
*H04W 72/04* (2009.01)
*H04L 5/00* (2006.01)

(52) U.S. Cl.
CPC ............... *H04L 27/18* (2013.01); *H04L 27/34* (2013.01); *H04W 72/042* (2013.01)

(56) References Cited

U.S. PATENT DOCUMENTS

2009/0213769 A1    8/2009    Shen et al.
2011/0176443 A1    7/2011    Astely et al.

FOREIGN PATENT DOCUMENTS

| | | |
|---|---|---|
| EP | 1052797 A | 11/2000 |
| TW | I261441 | 9/2006 |
| WO | WO 01/37507 A | 5/2001 |
| WO | WO 2004/075023 A2 | 9/2004 |
| WO | WO 2007/117185 A | 10/2007 |
| WO | WO 2008/030936 A2 | 3/2008 |

OTHER PUBLICATIONS

Ericsson on Multiplexing Multiple ACK/NAK for TDD, 3GPP TSG-RAN WG1#53b R1-082453, Jun. 28, 2008.

Ericsson, Remaining Issues for TDD ACK/NAK Bundling and PUSCH, 3GPP TSG-RAN WG1#53b R1-082462, Jun. 25, 2008.

Min-Seok Kang et al: Performance Evaluation of IEEE 802.16d ARQ Algorithms with NS-2 Simulator, Communications, 2006 Asia-Pacific Conference on, IEEE PI Aug. 1, 2006, pp. 1-5, XP031024163.

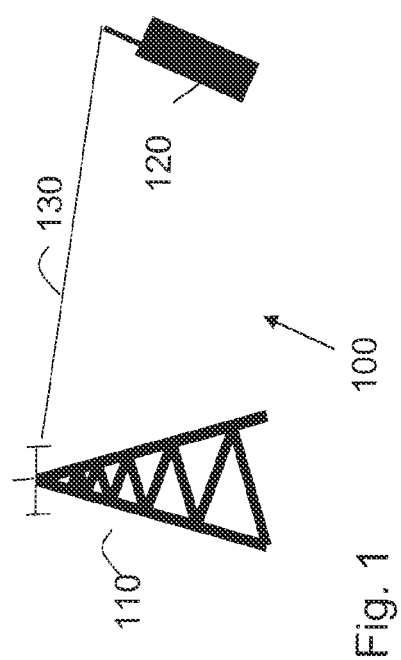

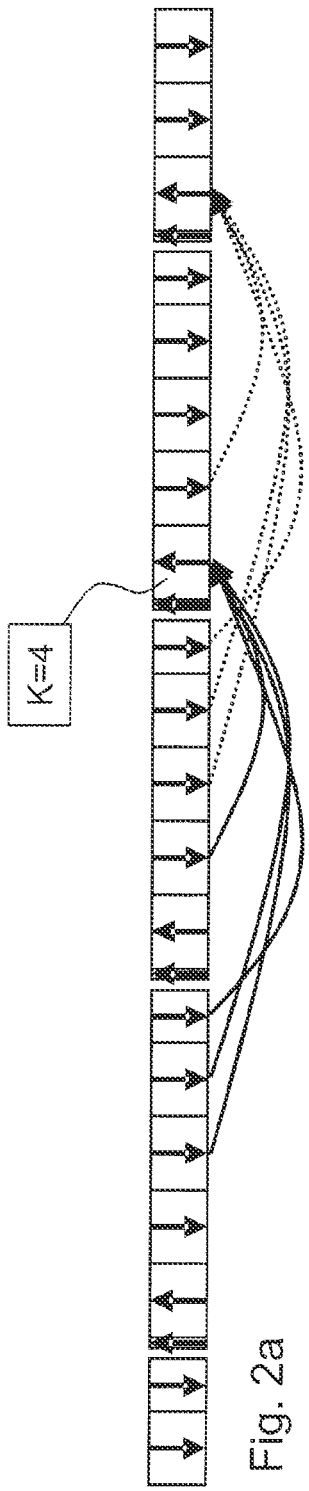
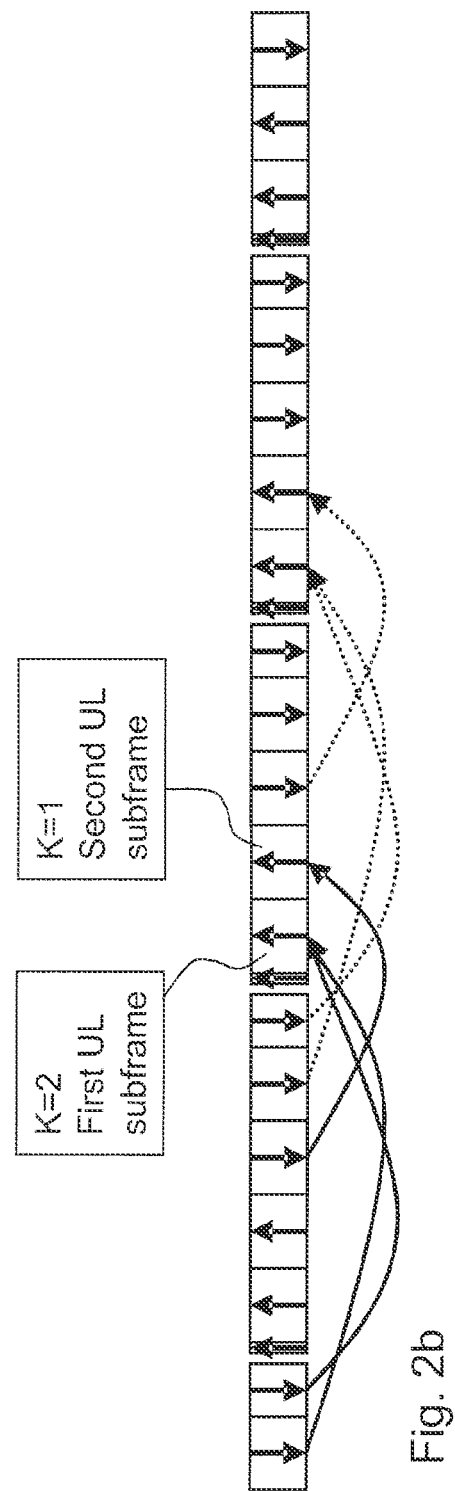
Fig. 2a
Fig. 2b

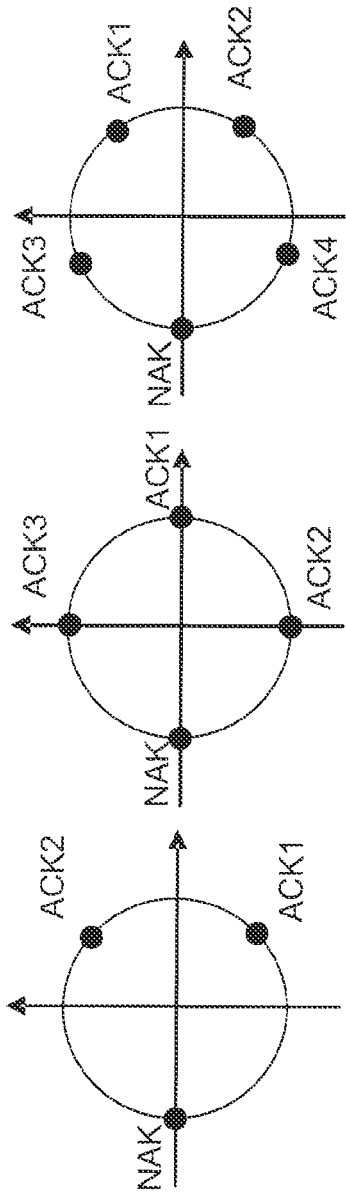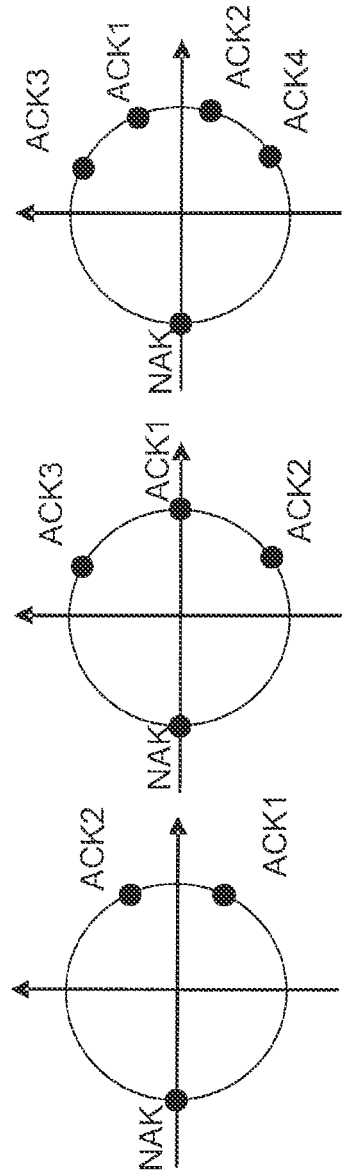
Fig. 3a
Fig. 3b
Fig. 3c
Fig. 4a
Fig. 4b
Fig. 4c

METHOD AND ARRANGEMENT IN A TELECOMMUNICATION SYSTEM

CROSS-REFERENCE TO RELATED APPLICATIONS

This application is a continuation of U.S. application Ser. No. 13/002,144, filed Dec. 30, 2010, pending, which claims the benefit of U.S. Provisional Application No. 61/076,899, filed Jun. 30, 2008, which claims the benefit of PCT Application No. PCT/SE2008/051427, filed on Dec. 9, 2008, the disclosure of which is incorporated herein by reference.

TECHNICAL FIELD

The present invention relates to a method and an arrangement in a base station and a method and an arrangement in a mobile terminal. In particular, it relates to the handling of a "ACK"/"NAK" message provided to the base station by the terminal.

BACKGROUND

A key requirement on Long Term Evolution (LTE) currently being standardized in 3GPP is frequency flexibility, and for this purpose carrier bandwidths between 1.4 MHz and 20 MHz are supported, as is both frequency division duplex (FDD) and time division duplex (TDD), so that both paired and unpaired spectrum can be used. For FDD the downlink (DL), i.e. the link from the base stations to the mobile terminals, and uplink (UL), i.e. the link from the mobile terminals to the base stations, use different frequencies and can hence transmit simultaneous. For TDD, uplink and downlink use the same frequency and cannot transmit simultaneously. Uplink and downlink can however share the time in a flexible way, and by allocating different amounts of time, such as the number of subframes of a radio frame, to uplink and downlink, it is possible to adapt to asymmetric traffic and resource needs in uplink and downlink.

The above asymmetry also leads a significant difference between FDD and TDD. Whereas for FDD the same number of uplink and downlink subframes is available during a radio frame, for TDD that the number of uplink and downlink subframes may be different. One of many consequences of this is that in FDD a mobile terminal can always send feedback in response to a DL assignment of resources in an UL subframe subject to a certain fixed processing delay. In other words, every DL subframe can be associated to a specific later UL subframe for feedback generation in way that this association is one-to-one, i.e. to each UL subframes is associated exactly one DL subframe. For TDD however, since the number of UL and DL subframes during a radio frame may be different, it is in general not possible to construct such one-to-one association. For the typical case with more DL subframes than UL subframes, it is rather so that feedback from several DL subframes needs to be transmitted in each UL subframe.

In LTE, a radio frame of 10 ms duration is divided into ten subframes, each 1 ms long. In case of TDD, a subframe can be assigned to uplink or downlink, i.e. uplink and downlink transmission cannot occur at the same time. Furthermore, each 10 ms radio frame is divided into two half-frames of 5 ms duration where each half-frame comprises of five subframes. The first subframe of a radio frame is always allocated to DL transmission. The second subframe is a special subframe and it is split into three special fields, DwPTS, GP and UpPTS, with a total duration of 1 ms. UpPTS is used for uplink transmission of sounding reference signals and, if so configured, reception of a shorter random access preamble. No data or control signaling can be transmitted in UpPTS. GP is used to create a guard period between periods of DL and UL subframes and may be configured to have different lengths in order to avoid interference between UL and DL and is typically chosen based on the supported cell radius. The DwPTS field is used for downlink transmission much like any other DL subframe with the difference that it has shorter duration.

Different allocations of the remaining subframes to UL and DL are supported, both allocations with 5 ms periodicity in which the first and second half-frame have identical structure, and allocations with 10 ms periodicity for which the half-frames are organized differently. For certain configurations the entire second half-frame is assigned to DL transmission.

In the DL of LTE, Orthogonal Frequency Division Multiplex (OFDM) with a sub carrier spacing of 15 kHz is used. In the frequency dimension the subcarriers are grouped into resource blocks, each containing twelve consecutive subcarriers. The number of resource blocks depends on the system bandwidth, and the minimum bandwidth corresponds to six resource blocks. Depending on the configured cyclic prefix length a 1 ms subframe contains either 12 or 14 OFDM symbols in time. The term resource block is also used to refer to the two-dimensional structure of all OFDM symbols within a subframe, times a resource block of subcarriers. The downlink part of the special subframe DwPTS has a variable duration, and can assume lengths of 3, 9, 10, 11 or 12 OFDM symbols for the case with normal cyclic prefix, and 3, 8, 9 or 10 symbols for the case with extended cyclic prefix.

In order to improve performance of transmission in both the DL and UL direction, LTE uses Hybrid-ARQ (HARQ). The basic idea of HARQ is that after receiving data in a DL subframe the terminal attempts to decode it and then reports to the base station whether the decoding was successful (ACK, acknowledgement) or not (NAK, negative acknowledgement). In case of an unsuccessful decoding attempt the base station thus receives a NAK in a later UL subframe, and can retransmit the erroneously received data.

Downlink transmissions may be dynamically scheduled, i.e. in each subframe the base station transmits control information on which terminals are to receive data and upon which resources in the current DL subframe. By resources is here meant some set of resource blocks. The control signaling is transmitted in the first 1, 2 or 3 OFDM symbols in each subframe. (For system bandwidth < or =10, it is transmitted in the first 2, 3 or 4 OFDM symbols in each subframe). The data sent to a terminal in a single DL subframe is often referred to a transport block.

A terminal will thus listen to the control channel, and if it detects a DL assignment addressed to itself it will try to decode the data. It will also generate feedback in response to the transmission, in the form of an ACK or a NAK depending on whether the data was decoded correctly or not. Furthermore, from the control channel resources on which the assignment was transmitted by the base station, the terminal can determine the corresponding Physical Uplink Control Channel resource (PUCCH) in case that the ACK/NACK is transmitted on the PUCCH. The PUCCH resource may also be configured by the network, which is the case when a channel quality report or a scheduling request is transmitted at the same time as the ACK/NAK feedback is to be provided.

For LTE FDD the terminal will in response to a detected DL assignment in subframe n, send an ACK/NAK report in uplink subframe n+4. For the case with so-called Multiple In Multiple Out (MIMO) multi-layer transmission two transport blocks are transmitted in a single DL subframe, and the terminal will respond with two ACK/NAK reports in the corresponding uplink subframe.

The assignment of resources to the terminals is handled by the scheduler, which takes into account traffic and radio conditions so as to use the resources efficiently while also meeting delay and rate requirements. Scheduling and control signaling may be done on a subframe to subframe basis, i.e. each downlink subframe is scheduled independently of others.

As described above, the first step for a terminal to receive data from the base station in a DL subframe is to detect a DL assignment in the control field of a DL subframe. In the case that the base station sends such an assignment but the terminal fails to decode it, the terminal does obviously not know that is was scheduled and will hence not respond with an ACK/NAK in the uplink. This situation is referred to as a missed DL assignment. If the absence of an ACK/NAK can be detected by the base station, it can take this into account for subsequent retransmissions. Typically the base station should at least retransmit the missing packet, but it may also adjust some other transmission parameters.

There is not a one-to-one relation between UL and DL subframes as discussed above. Thus the terminal cannot always send an ACK/NAK in response to a DL assignment in subframe n in UL subframe n+4, since this subframe may not be allocated to UL transmission. Hence each DL subframe may be associated with a certain UL subframe subject to a minimum processing delay, meaning that ACK/NAKs in response to DL assignments in subframe n are reported in subframe n+k with k>3. Furthermore, if the number of DL subframes is larger than the number of UL subframes, ACK/NAKs in response to assignments in multiple DL subframes may need to be sent in a single UL subframe. For a given UL subframe, the number of associated DL subframes depends on the allocation of subframes to UL and DL, and can be different for different UL subframes within a radio frame.

Since DL assignments can be given independently across DL subframes, a terminal may be assigned DL transmissions in multiple DL subframes that are all to be acknowledged in a single UL subframe. Hence the uplink control signaling needs to support, in some way, feedback of ACK/NAKs from multiple DL transmissions from a terminal in a given UL subframe.

One obvious way to approach the above problem is to allow the terminal to transmit multiple individual (for each DL transmission) ACK/NAK bits in a single UL subframe. Such protocols have however worse coverage than transmission of one or two ACK/NAK reports. In addition, the more ACK/NAKs that are allowed to be transmitted from a single terminal, the more control channel resources need to be reserved in the uplink. To improve control signaling coverage and capacity, it has been agreed to do some form of compression, or bundling, of ACK/NAKs. This means that all ACK/NAKs that are to be sent in a given UL subframe are combined into a smaller number of bits, such as a single ACK/NAK report. As an example, the terminal can transmit an ACK only if the transport blocks of all the DL subframes were received correctly and hence to be acknowledged. In any other case, meaning that a NAK for at least one DL subframe is to be transmitted, a combined NAK is sent for all DL subframes.

Hence, as described above, to each UL subframe in TDD a set of DL subframes can be associated, rather than a single subframe as in FDD, for which DL transmissions are to be given ACK/NAK response in the given UL subframe. In the context of bundling this set is often referred to as the bundling window. The two basic approaches then include:

- Multiplexing of multiple ACK/NAKs, meaning that multiple individual ACK/NAK reports of the subframes are fed back. For the case with no MIMO, and a configuration with 3 DL subframes (including DwPTS) and two UL subframes as depicted in FIG. 2b, up to two bits of ACK/NAK feedback is fed back in subframe #2 and #7 and one up to one bit in subframes 3 and 8. In the general case, there may be a third state so that ACK/NACK/DTX is fed back. DTX then represents that the terminal did not receive/detect any assignment during in the corresponding DL subframe.
- Bundling of multiple ACK/NAKs, meaning that a single ACK/NAK is generated from the individual ACK/NAKs and that this single ACK/NAK is fed back. For the case with no MIMO, the terminal combines the ACK/NAKs of multiple DL subframes so that a single ACK/NAK is generated and fed back in all UL subframes.

A basic problem with ACK/NAK bundling and multiplexing is that a terminal may miss a DL assignment, which may not be indicated in the bundled response. For instance, assume that the terminal was scheduled in two consecutive DL subframes. In the first subframe the terminal misses the scheduling assignment and will not be aware that it was scheduled, while in the second subframe it did successfully receive the data. The terminal will, as a result, transmit an ACK, which the base station will assume holds for both subframes, including data in the first subframe the terminal was not aware of. As a result, data will be lost. The lost data needs to be handled by higher-layer protocols, which typically takes a longer time than hybrid-ARQ retransmissions and is less efficient. In fact, a terminal will not transmit any ACK/NAK in a given UL subframe, only if it missed every DL assignment that was sent during the bundling/multiplexing window associated with the UL subframe.

SUMMARY

It is therefore an object of the present invention to provide a method in a network unit, and an arrangement adapted to perform said method to improve the detection of missed DL assignment.

According to a first aspect of the present invention, the object is achieved by a method in a terminal for providing an ACK/NAK message to a base station. The base station and the terminal are comprised in a telecommunications system. The terminal counts the number of assigned downlink subframes detected from the base station resulting in k. The terminal then establishes whether each of a number of transport blocks comprised in the counted k downlink subframes is correctly received or not.

In the case when each one of the transport blocks, comprised in the k downlink subframes is estimated as correctly received the terminal provides to the base station an encoded ACK message for the k subframes, which comprises k, the number of subframes.

In the case when any of the transport blocks comprised in the number k downlink subframes is estimated as not correctly received, the terminal may provide one encoded NAK message for the k subframes bundled to the base station.

According to a second aspect of the present invention, the object is achieved by a method in a base station for handling an ACK/NAK message from a terminal. The base station and the terminal are comprised in a telecommunications system. The base station sends a number of downlink subframes comprising transport blocks to the terminal.

In the case when each one of the transport blocks comprised in the k downlink subframes is estimated as correctly received by the terminal, the base station receives from the terminal one encoded ACK message for k subframes. The encoded ACK message comprises k, the number of subframes detected by the terminal.

In the case when any of the transport blocks comprised in the number k downlink subframes is estimated by the terminal as not correctly received, the base station may receive one encoded NAK message for the k subframes bundled from the terminal.

According to a third aspect of the present invention, the object is achieved by an arrangement in a terminal for providing an ACK/NAK message to a base station. The base station and the terminal are comprised in a telecommunications system. The terminal arrangement comprises a counting unit configured to count the number of assigned downlink subframes detected from the base station resulting in k and an establishing unit configured to establish whether each of a number of transport blocks comprised in the counted k downlink subframes is correctly received or not. The terminal arrangement further comprises a sending unit configured to provide to the base station, an encoded ACK message for the k subframes, which comprises k, the number of subframes, when each one of the transport blocks, comprised in the k downlink subframes is estimated as correctly received. The sending unit may further be configured to provide to the base station one encoded NAK message for the k subframes bundled, when any of the transport blocks comprised in the number k downlink subframes is estimated as not correctly received.

According to a fourth aspect of the present invention, the object is achieved by an arrangement in a base station for handling ACK/NAK message from a terminal: The base station and the terminal are comprised in a telecommunications system. The base station arrangement comprises a sending unit configured to send a number of downlink subframes comprising transport blocks to the terminal. The base station arrangement further comprises a receiving unit configured to receive from the terminal one encoded ACK message for k subframes. The encoded ACK message comprises k, the number of subframes detected by the terminal. The encoded ACK message is received when each one of the transport blocks, comprised in the k downlink subframes is estimated as correctly received by the terminal. The receiving unit may further be configured to receive from the terminal one encoded NAK message for the k subframes bundled, when any of the transport blocks comprised in the number k downlink subframes is estimated by the terminal as not correctly received.

Since the number of received downlink subframes is transmitted when an ACK is transmitted, but not when a NAK is transmitted, the base station can avoid, or reduce the probability for, the case that a missed assignment is interpreted as an ACK, which causes additional delays due to higher layer retransmissions and so on. In case a NACK is transmitted, the base station can not interpret a missed assignment as being correctly received since it then typically assumes that at least one subframe has not been correctly received. Furthermore, as compared to always feeding back the number of received subframes, uplink performance is improved since a smaller number of different messages are possible and hence lower uplink signalling is needed. This in turn implies that the signalling is reduced and that the detection of missed downlink assignment is improved.

BRIEF DESCRIPTION OF THE DRAWINGS

The invention is described in more detail with reference to attached drawings illustrating exemplary embodiments of the invention and in which:

FIG. 1 is a schematic block diagram illustrating embodiments of a wireless telecommunication system.

FIGS. 2 a and b are schematic block diagrams illustrating embodiments of association of each downlink subframe with an uplink subframe for two different UL:DL allocations.

FIGS. 3 a, b and c are schematic diagrams illustrating embodiments of the invention.

FIGS. 4 a, b and c are schematic diagrams illustrating embodiments of the invention.

FIG. 9 is a schematic block diagram illustrating embodiments of a base station arrangement.

DETAILED DESCRIPTION

Figure 5:
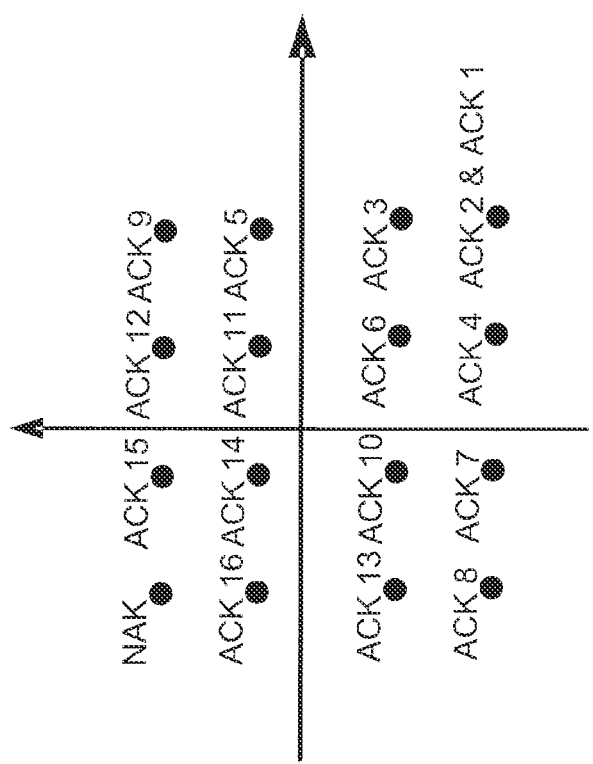
FIG. 5 is schematic block diagrams illustrating embodiments of a 16QAM constellation.

The present invention relates to a method in a terminal, and an arrangement adapted to perform said method, for providing to a base station, such as an eNodeB, information from which the base station can determine whether one or several assignments have been missed. The present invention also relates to a method in a base station such as an eNodeB, and an arrangement adapted to perform said method, for receiving from a terminal, information from which the base station can determine whether one or several assignments have been missed. The methods and arrangements may be put into practice in the embodiments described below.

The problem solved is to determine if the terminal has missed an assignment and hence "forgotten" to report a bundled NAK in case ACK/NAK bundling is used. If the terminal reports a NAK, there is no problem, but if the terminal reports an ACK there is a problem since the terminal should ideally report a NAK since of the subframes is not correctly received (in fact, the terminal missed the assignment and it did not even try to decode the data). The base station keeps tracks of the number of assigned subframes k', and the base station demodulates and estimates whether the terminal reports a NAK or an any of M-1 ACK messages (assuming that there are M constellation points). In case one of the M-1 ACK messages is received, say ACK k, it compares k with the number of assigned subframes k' and can in this way detect if the terminal missed any downlink assignment.

FIG. 1 depicts a wireless telecommunication system 100, such as e.g. the E-UTRAN, LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB). The telecommunication system 100 may use TDD or FDD and comprises a base station 110 and a terminal 120 adapted to communicate with each other over a radio channel 130. The base station 110 may be a NodeB, an eNodeB or any other network unit capable to communicate with a terminal over a radio channel that may be a TDD or FDD radio channel. The terminal 120 may be a mobile phone, a Personal Digital Assistant (PDA), a user equipment (UE) or any other network unit capable to communicate with a base station over a radio channel.

The base station 110 uses HARQ and ACK/NAK bundling, at least for certain uplink subframes, for transmitting data packets over the radio channel 130. The data packets are transported in transport blocks within subframes over the radio channel 130. For this purpose, the base station 110 schedules a number of subframes to be transmitted to the mobile terminal 120. If a NAK message is received from the mobile terminal 120, the base station 110 retransmits the non-acknowledged subframes until they have been acknowledged by the mobile terminal 120 or until a time period expires, which time period may be a pre-determined time period.

For a given uplink subframe, a number of downlink subframes, denoted K, transmitted from the base station 110 to the terminal 120 is associated. In some embodiments, a DL control channel carries a DL assignment in each DL subframe being associated with a certain UL control channel resource. In an exemplary case, ACK/NAKs from up to K DL subframes are to be bundled into one UL single subframe, i.e. the bundling window comprises K DL subframes. The DL subframes may be numbered from 1 to K. Within this set of subframes, the eNodeB can assign downlink transmissions to a given a terminal. The number of assigned subframes, k' can be between 0 and K.

Two examples are illustrated in FIG. 2. In the example, the number of associated DL subframes, K, is different for different subframes as well as for different asymmetries. In FIG. 2a the scenario of a 4DL: 1UL configuration is depicted. In this scenario the first (and only) UL subframe in each half frame is associated to four DL subframes, i.e. K=4.

In FIG. 2b, the scenario of a 3DL: 2UL configuration is depicted. In this scenario the first UL subframe in each half frame is associated to two DL subframes, i.e. K=2, while the second UL subframe is associated with a single DL subframe, i.e. K=1.

As mentioned above the base station 110 transmits data in k' subframes to the terminal. The terminal 120 at the receiver side will attempt to detect and decode DL assignments in each DL subframe. This makes it possible for the terminal 120 to keep track of the number of detected DL assignments during a bundling window, denoted k. In some embodiments, the terminal 120 comprises a counter. For each DL subframe in which it receives a DL assignment, the terminal 120 may increase the counter counting how many DL assignments it has received.

The terminal 120 will further attempt to decode the transport blocks in the DL subframes in which it has detected a DL assignment and by means of Cyclic Redundancy Check (CRC) estimate whether the transport block is correctly received or not. Now, the terminal 120 knows how many transport blocks that were successfully received. CRC may also be used for detecting DL assignments.

In some embodiments, a Downlink Assignment Index (DAI) is signaled to the terminal 120 from the base station 110 as part of the downlink assignment in each DL subframe. The DAI represents the number of previous and/or minimum number of future assigned DL subframes within the bundling window. If such is signaled, the terminal 120 may further compare the counter on the number of received DL assignments with a DAI signaled from the base station 110 to determine at least if any previous DL subframe has been missed or not.

When each one of the decoded transport block is correctly received within the k detected downlink subframes, a combined, or bundled encoded ACK message for k subframes is provided from the terminal 120 to the base station 110. The encoded ACK message also contains k, the number of subframes acknowledged. In the case of e.g. four different subframes, all being ACK, are represented as one combined ACK together with the number 4 to indicate that the ACK is valid for 4 subframes. The encoded ACK message can be transmitted using Phase-Shift Keying (PSK) modulation in such a way that the used constellation point is also determined by the number of received subframes in case a bundled ACK is transmitted.

When the terminal 120 detects for example using a DAI that a downlink assignment has been missed, or when a transport block failed to be decoded in any of the detected k subframes, a NAK message is provided to the base station 110. Note that the same message is provided to the base station independently of the number of received subframes. The NAK message may be modulated using PSK in such a way that constellation point that is different from the PSK constellation point that would have been used for modulating said ACK message for any k is used.

The base station 110 receives the transmitted message which can be either NACK or ACK of k subframes, where k can be between 1 and K. In case a NAK is received, the base station 110 knows that at least one out of the k' transmitted subframes have not been correctly received. The base station 110 will therefore retransmit the k' subframes accordingly. In case an ACK of k subframes is received by the base station 110, the base station 110 can compare this with the number of assigned subframes k', and if the received message does not agree with the number of transmitted subframes, the base station 110 can detect that at least one assignment has been completely missed and retransmit the corresponding subframes.

In some embodiments and for the case where the terminal 120 knows it has missed all DL assignment, the terminal 120 may respond with a NAK in this case. In some embodiments, the terminal 120 may choose to respond with a Discontinuous Transmission (DTX) which means that no response is given.

According to some embodiments, the terminal 120 responds to the base station 110 with at least one of K+1 messages representing:

NAK; for the case that at least one DL assignment was detected and that the decoding of least one of the transport block failed. It may also be generated for the case that no assignment was detected but that the terminal still needs to transmit an ACK/NAK, for example together with a scheduling request or a Channel Quality Indicator CQI report. Furthermore, NAK may also be generated for the case that the terminal 120 knows, for example due to the use of DAI, that at least one assignment has been missed.

ACK 1; for the case that one DL assignment was detected and that the transport block(s) passed the decoding and CRC.

ACK 2; for the case that two DL assignments were detected and that the transport block(s) passed the decoding and CRC, etc up to:

ACK K; for the case that K DL assignments were detected and the transport blocks passed the decoding and CRC.

In certain embodiments, the terminal 120 may choose to not respond (DTX) when the terminal 120 knows that at least one assignment has been missed, as enabled by the using of the DAI in the DL assignment (if such is present). Furthermore, it may also choose to respond with NAK in this case. Nevertheless, there may in certain embodiments be an additional message for DTX and there are then in total K+2 messages.

In further embodiments, less than K+1 (or K+2) messages are possible, and the meaning of different messages may then be slightly different. For example, with K=4 but only four different messages, (using QPSK modulation, see below), the terminal 120 responds to the base station 110 with at least one of the 4 messages representing for example:
NAK,
ACK1 or ACK4,
ACK 2, and
ACK 3,
or in another example:
NAK,
ACK 1,
ACK 2, and
ACK 3 or ACK 4,
or any other suitable combination.

In the embodiments where DAI is used, the base station 110 signals the number of previous and/or future assigned DL subframes within a bundling window to the terminal 120. As mentioned above, the terminal 120 can, when it has received multiple DL assignments, count the number and compare with the signaled number in the DAI to see whether it has missed any DL assignments.

In an alternative embodiment, which is suitable when a DAI is used, ACK k represents an ACK with subframe k, k=1, 2, . . . , K being the last received subframe. Since the base station 110 knows the contents of the DAI in each and every DL subframe, it will hence know what the terminal 120 based the bundled ACK/NAK on, if it knows which DL subframe was the last received. Then, the DAI may be used by the terminal 120 to see whether it missed any previous DL assignment, and by signaling the last received DL subframe to the base station 110, it is possible for the base station 110 to see whether any DL assignment was missed at the end.

In one embodiment, DAI represents the number of subframes being scheduled so far to the terminal 120 in a bundling window. In an exemplary scenario, the base station 110 transmits four subframes, S1, S2, S3 and S4 in a bundling window to the terminal 120, and signals to the terminal 120 that DAI is four in the last. If the terminal 120 misses one or more subframes in the end of the bundling window, the terminal 120 will believe that it has received all subframes. In the same way as mentioned above, the encoded ACK message may be modulated such that the number of the last received subframe, k, is modulated into a PSK constellation point. If receiving this ACK message, the base station 110 will understand that the terminal 120 has missed any subframe with a number above k and the base station 110 then retransmits the missed subframes to the terminal 120.

For example (A=correctly received, D=missed):
If S1-A, S2-A, S3-A, S4-D, the terminal 120 will provide the base station 110 with an ACK 3, because subframe 3 was the last correctly received subframe. The base station 110 will then retransmit S4.
If S1-A, S2-A, S3-D, S4-D, the terminal 120 will provide the base station 110 with an ACK 2, because subframe 2 was the last correctly received subframe. The base station 110 will then retransmit S3 and S4.
If S1-A, S2-D, S3-D, S4-D, the terminal 120 will provide the base station 110 with an ACK 1, because subframe 1 was the last correctly received subframe. The base station 110 will then retransmit S2, S3 and S4.

In the case when a subframe is missed not being in the end of the bundling window, the terminal 120 transmits an encoded NAK message to the base station 110. The encoded NAK message is modulated into a PSK constellation point being different from the PSK constellation point that would have been used for modulating an ACK message, in the same way as being described above. This will e.g. occur for the scenarios when:

S1-A, S2-D, S3-A, S4-A, or when
S1-A, S2-D, S3-D, S4-A, or when
S1-D, S2-A, S3-A, S4-A, etc.

In this case the base station 110 will not know which subframes that were not received by the terminal 120. The base station 110 may therefore retransmit all subframes S1, S2, S3 and S4 within the bundling window.

A scheduler in the base station 110 may schedule several terminals in the same subframes (inclusive the terminal 120), and as mentioned above, in some embodiments keep track of how many and which DL subframe the terminal 120 has been assigned resources in. By inspection of the HARQ feedback, it will know whether the transmissions within the bundling window were successful or not.

In some embodiments, a bundled ACK/NAK is transmitted from the terminal 120 to the base station 110 on PUCCH together with a Scheduling Request (SR) or a CQI report, or in general when the PUCCH resource can carry a PSK, then the modulation alphabet used can be taken as K+1 PSK. The following formula may be used:

$$S\_k = \exp(j*2*\pi/(K+1)*k), k=0,1,\ldots K$$

wherein $j=\sqrt{-1}$, K is the total number of possible subframes in the bundling window, i.e. not scheduled but possible to schedule, and k is the number of subframes being acknowledged in one encoded ACK message. S_k is the modulated symbol that is transmitted from the terminal 120. Some examples of PSK constellations are given in FIGS. 3a, b and c, of which FIG. 3b depicts a PSK constellation using this formula.

FIG. 3a shows a non-uniform PSK constellation wherein ACK1 and ACK2 is placed further away from NAK then from each other to be able have a higher requirement on NAK→ACK error then on ACK1→ACK2 error.

FIG. 3b shows a uniform PSK constellation wherein ACK1, ACK2, ACK3 and NAK are placed in a Quadrature Phase Shift Keying (QPSK) constellation. As QPSK is normally used for data hence it is easier for the base station 110 or the terminal 120 not having a special constellation ACK/NAK feedback. It may also be possible to reuse some of the implemented software or hardware when reading out the symbols or writing them in the base station 110 and the terminal 120 as the same mapping function is used for data.

FIG. 3c shows a non-uniform PSK constellation depicting different PSK constellation points for ACK1, ACK2, ACK3, ACK4 and NAK wherein ACK1 and ACK2 are placed further away from NAK then from each other to be able have a higher requirement on NAK→ACK error then on ACK1→ACK2 error. The ACK3 and ACK4 may be placed closer to NAK since it is not so likely that all 3 or 4 subframes will be missed at the same time the ACK3→ACK2, ACK4→ACK1 will not be set to a minimum.

Regarding the error requirements, in terms of Pr(DTX→ACK), i.e. that a missed assignment is misinterpreted as ACK, is higher or much higher than the corresponding requirement on Pr(NAK→ACK), i.e. that a NAK is misinterpreted as ACK. For example, the probability Pr(DTX→ACK) which represents the error probability that a missed DL assignment is interpreted as an acknowledgement is of the order 0.01-0.1 whereas the probability Pr(NAK→ACK) which represents the probability that a NAK is interpreted as an ACK is of the order 0.0001-0.001. The encoding of the messages may then be done so to exploit this. For this purpose, an alternative embodiment is to do the encoding using non-uniform K+1 PSK where the distance between NAK and the closest ACK point(s) is larger than the smallest distance between any two ACK points. This means that $$\min_{(i)} P(NAK \rightarrow ACK\_i) < \min_{(j,k)} P(ACK\_i \rightarrow ACK\_k)$$

The probability of any transmitted ACK messages being interpreted as a NAK is to be lower than the probability that the number of ACKs is misinterpreted. The above expression represents that a specific number of ACK subframes from the terminal 120 being misinterpreted as another number of ACK subframes in the base station 110, so that the error of NAK being decoded as any of the ACKs is smaller than any error event that one ACK is decoded as another ACK. Some examples are shown in FIGS. 4a, b and c.

FIG. 4a shows a non-uniform PSK constellation for ACK1, ACK2 and NAK, using similar principle as illustrated in FIG. 3a but even more protection for the NAK→ACK error.

FIG. 4b shows a non-uniform PSK constellation for ACK1, ACK2, ACK3 and NAK using similar principle as illustrated in FIG. 4a but being extended to 3 ACKs.

FIG. 4c shows a non-uniform PSK constellation for ACK1, ACK2, ACK3, ACK4 and NAK using similar principle as illustrated in FIG. 4a but being extended to 4 ACKs In some embodiments, QAM constellations can be used instead of a PSK, such as e.g. 16QAM, FIG. 5 shows a constellation wherein ACK1 and ACK2 (the same constellation point), ACK3, ACK4, ACK5, ACK6, ACK7, ACK8, ACK9, ACK10, ACK11, ACK12, ACK13, ACK14, ACK15, ACK16 and NAK are placed in a 16QAM constellation, which e.g. may be used in LTE advanced. In a more practical setting only a subset of the 16 constellation points are used with distances chosen so as to meet the different target error probabilities.

Thus, a major benefit of the invention is that the signalling is reduced. Instead of signalling log(2K) bits which is required to convey information on both ACK/NAK and the number of received subframes, only log(K+1) bits can be used since the number of subframes is only encoded when an ACK is transmitted.

The present invention may, of course, be carried out in other ways than those specifically set forth herein without departing from essential characteristics of the invention. The present embodiments are to be considered in all respects as illustrative and not restrictive.

It is to be noted that although terminology from 3GPP LTE has been used in this disclosure to exemplify the invention, this should not be seen as limiting the scope of the invention to only the aforementioned system. Other wireless systems, including LTE-Adv, WCDMA, WiMax, UMB and GSM, as well as future wireless systems, may also benefit from exploiting the ideas covered within this disclosure.

Figure 6:
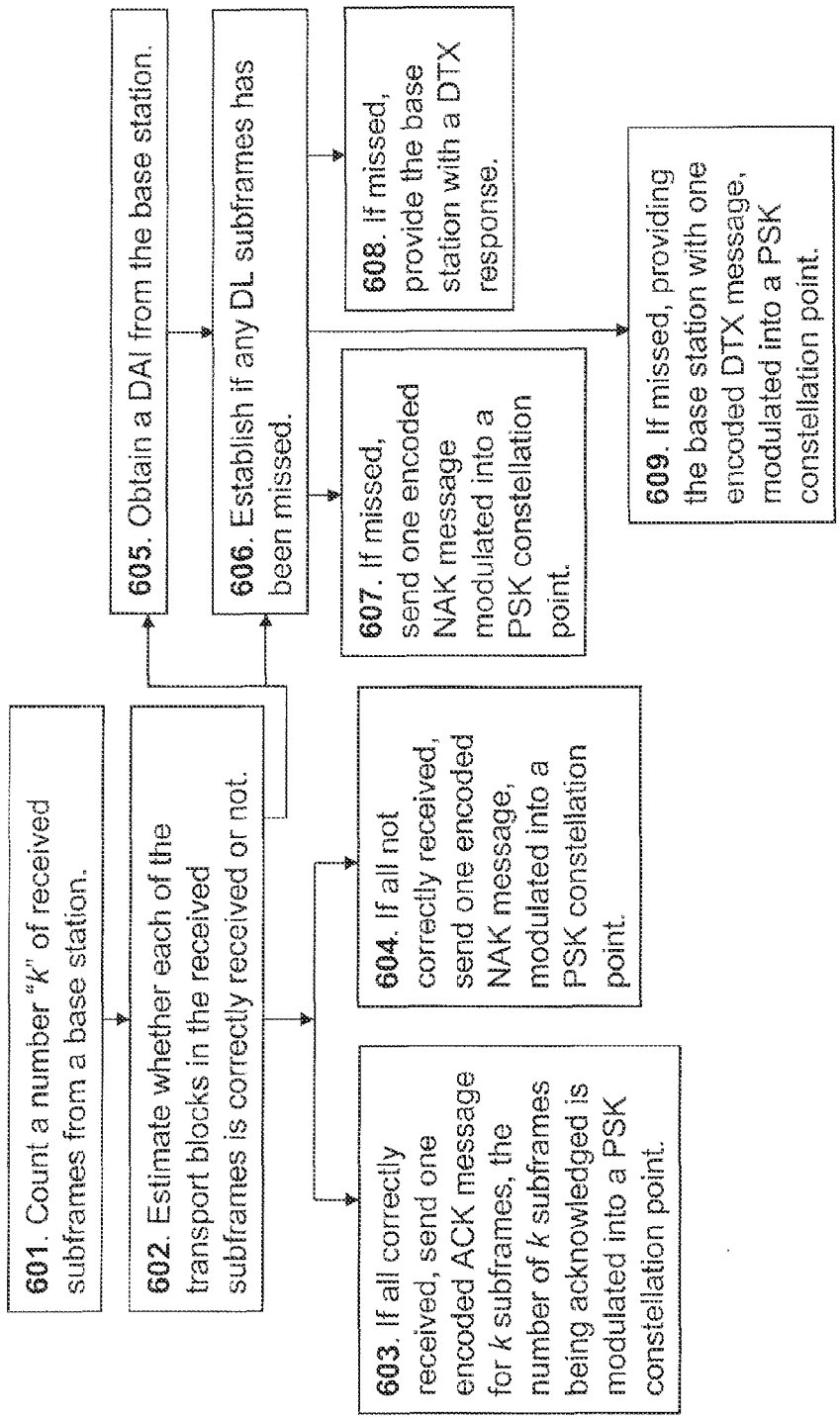
FIG. 6 is a flow chart illustrating embodiments of a method in a mobile terminal.

The method steps in the terminal 120 for providing an ACK/NAK message to the base station 110 according to some embodiments will now be described with reference to a flowchart depicted in FIG. 6. As mentioned above, the base station 110 and the terminal 120 are comprised in a telecommunications system. The method comprises the steps of:

601. The terminal 120 counts the number of assigned downlink subframes detected from the base station 110 resulting in k.

602. The terminal 120 then establishes whether each of a number of transport blocks comprised in the counted k downlink subframes is correctly received or not.

603. When each one of the transport blocks, comprised in the k downlink subframes is estimated as correctly received, the terminal 120 provides to the base station 110 an encoded ACK message for the k subframes. The ACK message comprises k, the number of subframes.

The encoded ACK message may be modulated such that the constellation point is selected depending on k, the number of subframes being acknowledged.

604. When any of the transport blocks comprised in the number k downlink subframes is estimated as not correctly received, the terminal 120 may provide one encoded NAK message for the k subframes bundled to the base station 110.

The encoded NAK message may be modulated using a PSK constellation point that is different from the PSK constellation point that would have been used for modulating said ACK message.

605. This is an optional step. In some embodiments, the terminal 120 may obtain a Downlink Assignment Index "DAI" from the base station 110. In these embodiments, the DAI may represent the number of previous and future assigned DL subframes.

606. This step is optional. In some embodiments the terminal 120 establishes if any DL subframes transmitted from the base station 110 has been missed.

In some embodiments where a DAI was obtained in step 605 the terminal 120 compares the number of received DL assignments with the DAI signalled from the base station 110 to determine if any previous DL subframe has been missed or not.

607. This step is optional. When a DL subframe transmitted from the base station 110 has been established to be missed, the terminal 120 may provide to the base station 110 one encoded NAK message. The encoded NAK message is modulated into a PSK constellation point being different from the PSK constellation point that would have been used for modulating said ACK message.

608. This step is optional and an alternative to step 607. When all DL subframes transmitted from the base station 110 has been established to be missed, the terminal 120 may provide a response to the base station 110 with a Discontinuous Transmission "DTX".

609. This step is optional and an alternative to step 607 and 608. When all DL subframes transmitted from the base station 110 has been established to be missed, the terminal 120 may provide one encoded DTX message to the base station 110. The encoded DTX message may be modulated into a PSK constellation point being different from the PSK constellation point that would have been used for modulating said ACK message.

In some embodiments, the terminal 120 uses PSK comprising multiple PSK constellation points. In some of these embodiments, the terminal 120 uses a first constellation point NAK of the multiple PSK constellation points when transmitting the encoded NAK message, and different second constellation points ACK1, ACK2, ACK3, ACK4 of the multiple PSK constellation points when transmitting the encoded ACK message for different values of k. The different second constellation points ACK1, ACK2, ACK3, and ACK4 are all different from the first constellation point NAK and where the selected constellation points may depend on the number of received subframes k.

In some embodiments, uniform PSK is used for transmitting the encoded ACK message for k subframes, or NAK message, or DTX message into a PSK constellation point.

In some alternative embodiments, Quadrature Phase Shift Keying "QPSK" is used for transmission of the respective encoded ACK message for k subframes, or NAK message, or DTX message.

In a specific alternative embodiment the terminal 120 uses QPSK comprising, a first QPSK constellation point, a second QPSK constellation point, a third QPSK constellation point and a fourth QPSK constellation point. In this embodiment, the terminal 120 uses the first constellation point when modulating the encoded NAK message, the second constellation point when modulating the encoded ACK message for k subframes when k=1 or 4, the third constellation point when modulating the encoded ACK message for k subframes when k=2, and the fourth constellation point when modulating the encoded ACK message for K subframes when k=3.

In a specific embodiment the terminal uses X-QAM for modulating the encoded ACK message for k subframes, or NAK message, or DTX message into an X-QAM constellation point. X can take on any of $2^2, 2^3, 2^4, \ldots 2^N$.

In some embodiments the terminal 120 uses non-uniform PSK for modulating the encoded ACK message for K subframes, or NAK message, or DTX message into a PSK constellation point.

Figure 7:
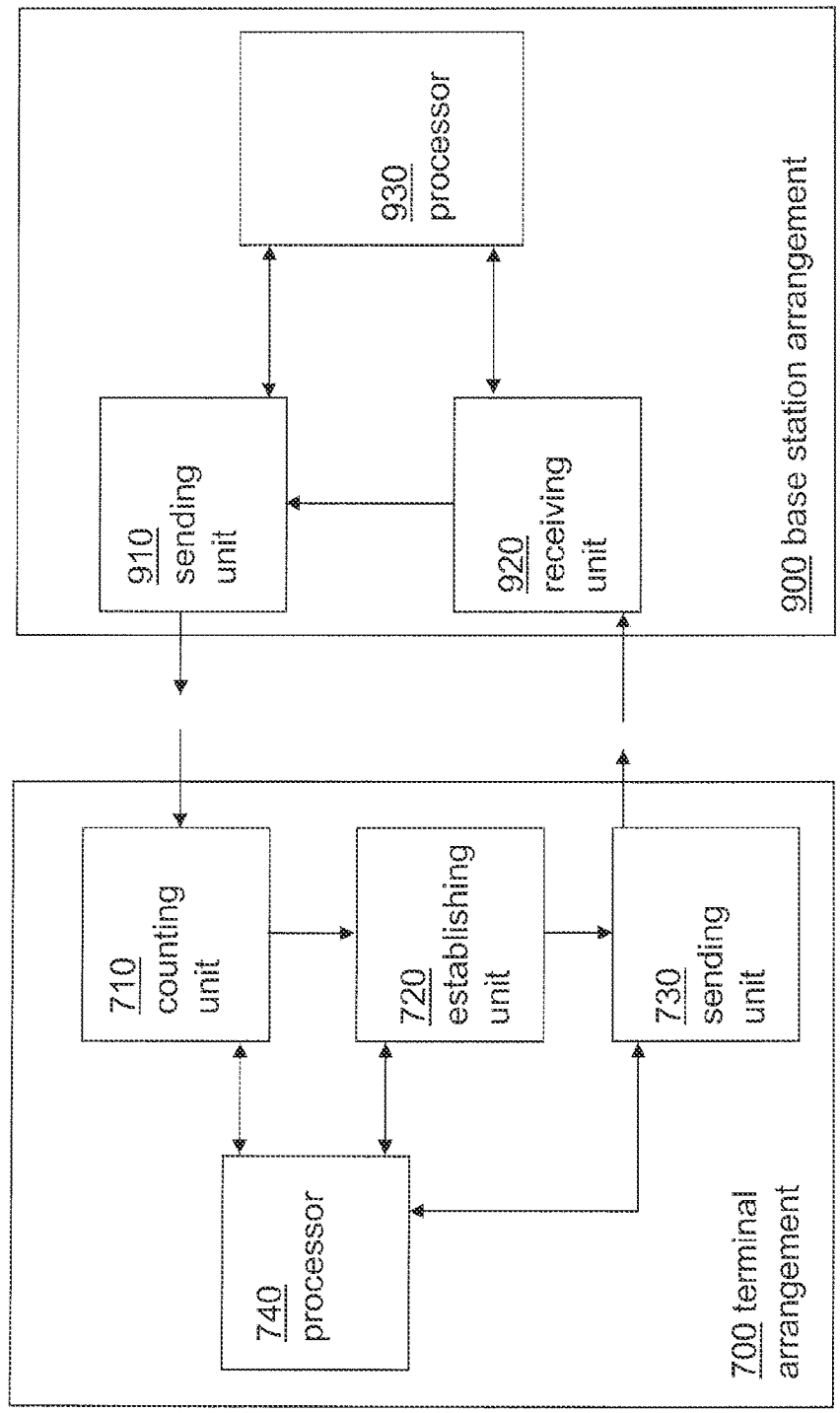
FIG. 7 is a schematic block diagram illustrating embodiments of a mobile terminal arrangement.

To perform the method steps above for providing an ACK/NAK message to the base station 110, the terminal 120 comprises an arrangement 700 depicted in FIG. 7. As mentioned above, the base station 110 and the terminal 120 are comprised in a telecommunications system.

The terminal arrangement 700 comprises a counting unit 710 configured to count the number of assigned downlink subframes detected from the base station 110 resulting in k.

The terminal arrangement 700 further comprises an establishing unit 720 configured to establish whether each of a number of transport blocks comprised in the counted k downlink subframes is correctly received or not. The establishing unit 720 may further be configured to establish if any DL subframes transmitted from the base station 110 has been missed.

The terminal arrangement 700 further comprises a sending unit 730 configured to provide to the base station 110, an encoded ACK message for the k subframes. The ACK message comprises k, the number of subframes, when each one of the transport blocks, comprised in the k downlink subframes is estimated as correctly received. The encoded ACK message may be modulated such that the constellation point is selected depending on k, the number of subframes being acknowledged.

The sending unit 730 is further configured to provide to the base station 110 one encoded NAK message for the k subframes bundled, when any of the transport blocks comprised in the number k downlink subframes is estimated as not correctly received. The encoded NAK message may be modulated using a PSK constellation point being different from the PSK constellation point that would have been used for modulating said ACK message.

In some embodiments the sending unit 730 is further configured to provide one encoded NAK message to the base station 110 when a DL subframe transmitted from the base station 110 has been established to be missed. The encoded NAK message is modulated into a PSK constellation point being different from the PSK constellation point that would have been used for modulating said ACK message.

In an alternative embodiment, the sending unit 730 may further be configured to provide a response to the base station 110 with a Discontinuous Transmission "DTX", when all DL subframes transmitted from the base station 110 has been established to be missed.

In a further alternative embodiment the sending unit 730 is further configured to provide to the base station 110 one encoded DTX message when all DL subframes transmitted from the base station 110 has been established to be missed.

The encoded DTX message is modulated into a PSK constellation point being different from the PSK constellation point that would have been used for modulating said ACK message.

In some embodiments, the terminal 120 is adapted to use PSK comprising multiple PSK constellation points. In some of these embodiments the terminal 120 is adapted to use a first constellation point NAK of the multiple PSK constellation points when transmitting the encoded NAK message, and a different second constellation points ACK1, ACK2, ACK3, ACK4 of the multiple PSK constellation points when transmitting the encoded ACK message for different values of k. The different second constellation points ACK1, ACK2, ACK3, and ACK4 may all be different from the first constellation point NAK and the selected constellation points may depend on the number of received subframes k.

The terminal arrangement 700 may further comprise a receiving unit 730 configured to obtain a DAI from the base station 110. The DAI represents the number of previous and future assigned DL subframes. In these embodiments, the establishing unit 720 may further be configured to comparing the number of received DL assignments with the DAI signaled from the base station 110 to determine if any previous DL subframe has been missed or not.

In some embodiments, uniform PSK is adapted to be used for modulating the encoded ACK message for K subframes, or NAK message, or DTX message into a PSK constellation point.

In some embodiments Quadrature Phase Shift Keying QPSK is adapted to be used for the respective encoded ACK message for k subframes, or NAK message, or DTX message transmitted by the terminal 120.

In a specific embodiments the terminal 120 is adapted to use QPSK comprising, a first QPSK constellation point, a second QPSK constellation point, a third QPSK constellation point and a fourth QPSK constellation point. In this embodiment the terminal 120 is adapted to use the first constellation point when modulating the encoded NAK message, the second constellation point when modulating the encoded ACK message for k subframes when k=1 or 4, the third constellation point when modulating the encoded ACK message for k subframes when k=2, and the fourth constellation point when modulating the encoded ACK message for k subframes when k=3.

In some embodiments X-QAM is used for modulating the encoded ACK message for k subframes, or NAK message, or DTX message into a X-QAM constellation point, where X can take on any of $2^2, 2^3, 2^4, \ldots 2^N$.

In some embodiments non-uniform PSK is adapted to be used for modulating the encoded ACK message for k subframes, or NAK message, or DTX message into a PSK constellation point.

Figure 8:
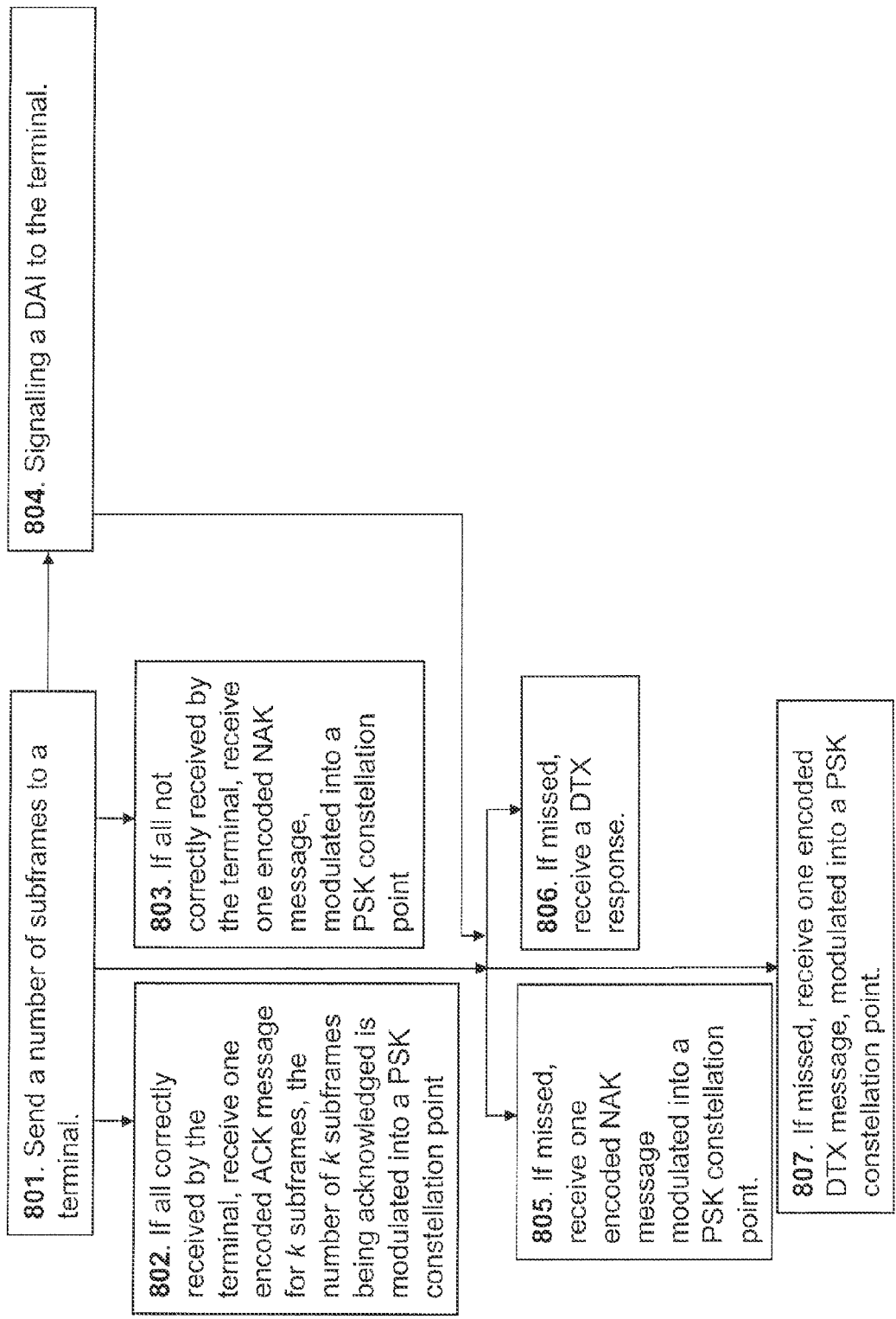
FIG. 8 is a flow chart illustrating embodiments of a method in a base station.

The method steps in the base station 110, for handling an acknowledgement ACK/NAK report from a terminal 120, according to some embodiments will now be described with reference to a flowchart depicted in FIG. 8. As mentioned above the base station 110 and the terminal 120 are comprised in a telecommunications system. The method comprises the steps of:

801. The base station 110 sends a number of downlink subframes comprising transport blocks to the terminal 120.

802. When each one of the transport blocks, comprised in the k downlink subframes is estimated as correctly received by the terminal 120, the base station receives one encoded ACK message for k subframes from the terminal 120. The encoded ACK message comprises k, the number of subframes detected by the terminal 120. The terminal 120 has counted the received subframes resulting in the number k.

The encoded ACK message may be modulated such that the constellation point is selected depending on k, the number of subframes being acknowledged.

803. When any of the transport blocks comprised in the number k downlink subframes is estimated by the terminal 120 as not correctly received, the base station 110 may receive from the terminal 120 one encoded NAK message for the k subframes bundled. The encoded NAK message may be modulated using a PSK constellation point being different from the PSK constellation point that would have been used for modulating said ACK message.

804. This is an optional step. In some embodiments the base station 110 signals DAI to the terminal 120: The DAI represents the number of previous and future assigned DL subframes. The DAI will be used by the terminal 120 for establishing if any downlink subframes transmitted from the base station 110 has been missed, by comparing the number of received downlink assignments with the DAI signalled from the base station 110.

805. This is an optional step. When a downlink subframe transmitted from the base station 110 to the terminal 120 has been established to be missed by the terminal 120, the base station 110 may receive one encoded NAK message from the terminal 120. The encoded NAK message is modulated into a PSK constellation point is different from the PSK constellation point that would have been used for modulating said ACK message.

806. This is an optional step. When all the K DL subframes transmitted from the base station 110 to the terminal 120 has been established to be missed by the terminal 120, the base station 110 may receive a response from the terminal 120 with a Discontinuous Transmission DTX.

807. This is also an optional step. When all the DL subframes transmitted from the base station 110 to the terminal 120 has been established to be missed by the terminal 120, the base station 110 may receive from the terminal 120 one encoded DTX message. The encoded DTX message is modulated into a PSK constellation point being different from the PSK constellation point that would have been used for modulating said ACK message.

In some embodiments, PSK comprising multiple PSK constellation points are used in the received ACK/NAK message. In these embodiments a first constellation point NAK of the multiple PSK constellation points is used for transmitting the encoded NAK message, and different second constellation points ACK1, ACK2, ACK3, ACK4 of the multiple PSK constellation points is used for transmitting the encoded ACK message for different values of k. The different second constellation points ACK1, ACK2, ACK3, and ACK4 may all be different from the first constellation point NAK and the selected constellation points may depends on the number k.

In some embodiments uniform PSK is used for modulation of the encoded ACK message for k subframes, or NAK message, or DTX message into a PSK constellation point.

In some embodiments QPSK is used for the respective encoded ACK message for k subframes, or NAK message, or DTX message transmitted by the terminal 120.

In some further embodiments QPSK is used comprising a first QPSK constellation point, a second QPSK constellation point, a third QPSK constellation point and a fourth QPSK constellation point. In these embodiments the first constellation point is used for transmitting the encoded NAK message, the second constellation point is used for modulation in the encoded ACK message for k subframes when k=1 or 4, the third constellation point is used for modulation in the encoded ACK message for K subframes when k=2, and the forth constellation point is used for modulation in the encoded ACK message for k subframes when k=3.

In some alternative embodiments X-QAM may be used for modulating the encoded ACK message for k subframes, or NAK message, or DTX message into a X-QAM constellation point, where X can take on any of $2^2, 2^3, 2^4, \ldots 2^N$.

In some alternative embodiments non-uniform PSK is used for modulation of the encoded ACK message for k subframes, or NAK message, or DTX message into a PSK constellation point.

To perform the method steps above for handling an acknowledgement ACK/NAK message from a terminal 120, the base station 110 comprises an arrangement 900 depicted in FIG. 9. As mentioned above, the base station 110 and the terminal 120 are comprised in a telecommunications system.

The base station arrangement 900 comprises a sending unit 910 configured to send a number of downlink subframes comprising transport blocks to the terminal 120.

The sending unit 910 may further be configured to signal a DAI to the terminal 120. The DAI represents the number of previous and future assigned DL subframes, which DAI is adapted to be used by the terminal 120 for establishing if any DL subframes transmitted from the base station 110 has been missed, by comparing the number of received DL assignments with the DAI signaled from the base station 110.

The base station arrangement 900 further comprises a receiving unit 920 configured to receive from the terminal 120 one encoded ACK message for k subframes, which encoded ACK message comprises k, the number of subframes detected by the terminal 120, when each one of the transport blocks, comprised in the k downlink subframes is estimated as correctly received by the terminal 120. The encoded ACK message may be modulated such that the constellation point is selected depending on k, the number of subframes being acknowledged.

The receiving unit 920 is further configured to receive from the terminal 120 one encoded NAK message for the k subframes bundled, when any of the transport blocks comprised in the number k downlink subframes is estimated by the terminal 120 as not correctly received. The encoded NAK message may be modulated using a PSK constellation point being different from the PSK constellation point that would have been used for modulating said ACK message.

The receiving unit 920 may further be configured to receive a response from the terminal 110 with a Discontinuous Transmission DTX, when all the k DL subframes transmitted from the base station 110 to the terminal 120 has been established to be missed by the terminal 120.

The receiving unit 920 may further be configured to receive from the terminal 120 one encoded DTX message when all the DL subframes transmitted from the base station 110 to the terminal 120 has been established to be missed by the terminal 120. The encoded DTX message is modulated into a PSK constellation point being different from the PSK constellation point that would have been used for modulating said ACK message.

In some embodiments PSK comprising multiple PSK constellation points is adapted to be used in the received ACK/NAK message. In these embodiments a first constellation point NAK of the multiple PSK constellation points is adapted to be used for the encoded NAK message, and a different second constellation points ACK1, ACK2, ACK3, ACK4 of the multiple PSK constellation points is adapted to be used for the encoded ACK message for different values of k. The different second constellation points ACK1, ACK2, ACK3, and ACK4 may all be different from the first constellation point NAK and the selected constellation points may depend on the number k.

In some embodiments uniform PSK is used for modulation of the encoded ACK message for k subframes, or NAK message, or DTX message into a PSK constellation point.

In some embodiments QPSK is used for the respective encoded ACK message for k subframes, or NAK message, or DTX message, transmitted by the terminal 120.

In some further embodiments QPSK is used comprising a first QPSK constellation point, a second QPSK constellation point, a third QPSK constellation point and a fourth QPSK constellation point. In these embodiments the first constellation point is used for modulation in the encoded NAK message, the second constellation point is used for modulation in the encoded ACK message for k subframes when k=1 or 4, the third constellation point is used for modulation in the encoded ACK message for k subframes when k=2, and the forth constellation point is used for modulation in the encoded ACK message for k subframes when k=3.

In some alternative embodiments X-QAM may be used for modulating the encoded ACK message for K subframes, or NAK message, or DTX message into a X-QAM constellation point, where X can take on any of $2^2, 2^3, 2^4, \ldots 2^N$.

In some alternative embodiments non-uniform PSK is used for modulation of the encoded ACK message for K subframes, or NAK message, or DTX message into a PSK constellation point.

The present mechanism for above for handling an acknowledgement ACK/NAK report, may be implemented through one or more processors, such as a processor 740 in the terminal arrangement 700 depicted in FIG. 7 or the processor 930 in the base station arrangement 900 depicted in FIG. 9, together with computer program code for performing the functions of the present solution. The program code mentioned above may also be provided as a computer program product, for instance in the form of a data carrier carrying computer program code for performing the present solution when being loaded into the base station 110 or the terminal 120. One such carrier may be in the form of a CD ROM disc. It is however feasible with other data carriers such as a memory stick. The computer program code can furthermore be provided as pure program code on a server and downloaded to the base station 110 or the terminal 120 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. An arrangement in a base station for handling an acknowledgement/not-acknowledgement (ACK/NAK) message from a terminal, the base station and the terminal in a telecommunication system, the arrangement comprising:
    a sending unit configured to send a number of downlink subframes including transport blocks to the terminal and to signal to the terminal in each downlink subframe a downlink assignment index (DAI) that represents a number of previous assigned downlink subframes and that enables the terminal to establish if any downlink subframe transmitted by the base station has been missed by comparing a number k of received downlink assignments with a DAI; and
    a receiving unit configured to receive from the terminal for the k downlink assignments one encoded ACK message that includes k, the number of downlink assignments detected by the terminal, when each transport block in the downlink subframes in which the terminal has detected a downlink assignment is estimated as correctly received by the terminal,
        wherein the receiving unit is further being configured to receive from the terminal one encoded NAK message that is modulated into a constellation point that is different from a constellation point into which the ACK message would have been modulated when a downlink assignment transmitted by the base station to the terminal has been established to be missed by the terminal,
        wherein the receiving unit is further configured to receive the encoded ACK message modulated such that the constellation point depends on k, the number of subframes being acknowledged, and to receive the encoded NAK message modulated using a constellation point different from the constellation point that would have been used for modulating the ACK message, and
        wherein a received ACK/NAK message uses phase-shift keying (PSK) modulation including multiple PSK constellation points; a first PSK constellation point is used for the encoded NAK message; different second PSK constellation points are used for the encoded ACK message for respective different values of k; the second PSK constellation points are all different from the first PSK constellation point; and PSK constellation points are selected based on k.

* * * * *

UNITED STATES PATENT AND TRADEMARK OFFICE
CERTIFICATE OF CORRECTION

PATENT NO. : 9,094,199 B2  
APPLICATION NO. : 14/464025  
DATED : July 28, 2015  
INVENTOR(S) : Astely et al.

Page 1 of 1

It is certified that error appears in the above-identified patent and that said Letters Patent is hereby corrected as shown below:

On the Title Page, in Item (56), under "OTHER PUBLICATIONS", in Column 2, Line 1, delete "ACK NAK" and insert -- ACK/NAK --, therefor.

IN THE SPECIFICATION

In Column 1, Line 8, delete "pending," and insert -- now Pat. No. 8,867,384, --, therefor.

In Column 15, Line 13, delete "terminal 120:" and insert -- terminal 120. --, therefor.

In Column 16, Line 47, delete "terminal 110" and insert -- terminal 120 --, therefor.

Signed and Sealed this  
Fifteenth Day of March, 2016

Michelle K. Lee  
*Director of the United States Patent and Trademark Office*